Patented Sept. 9, 1924.

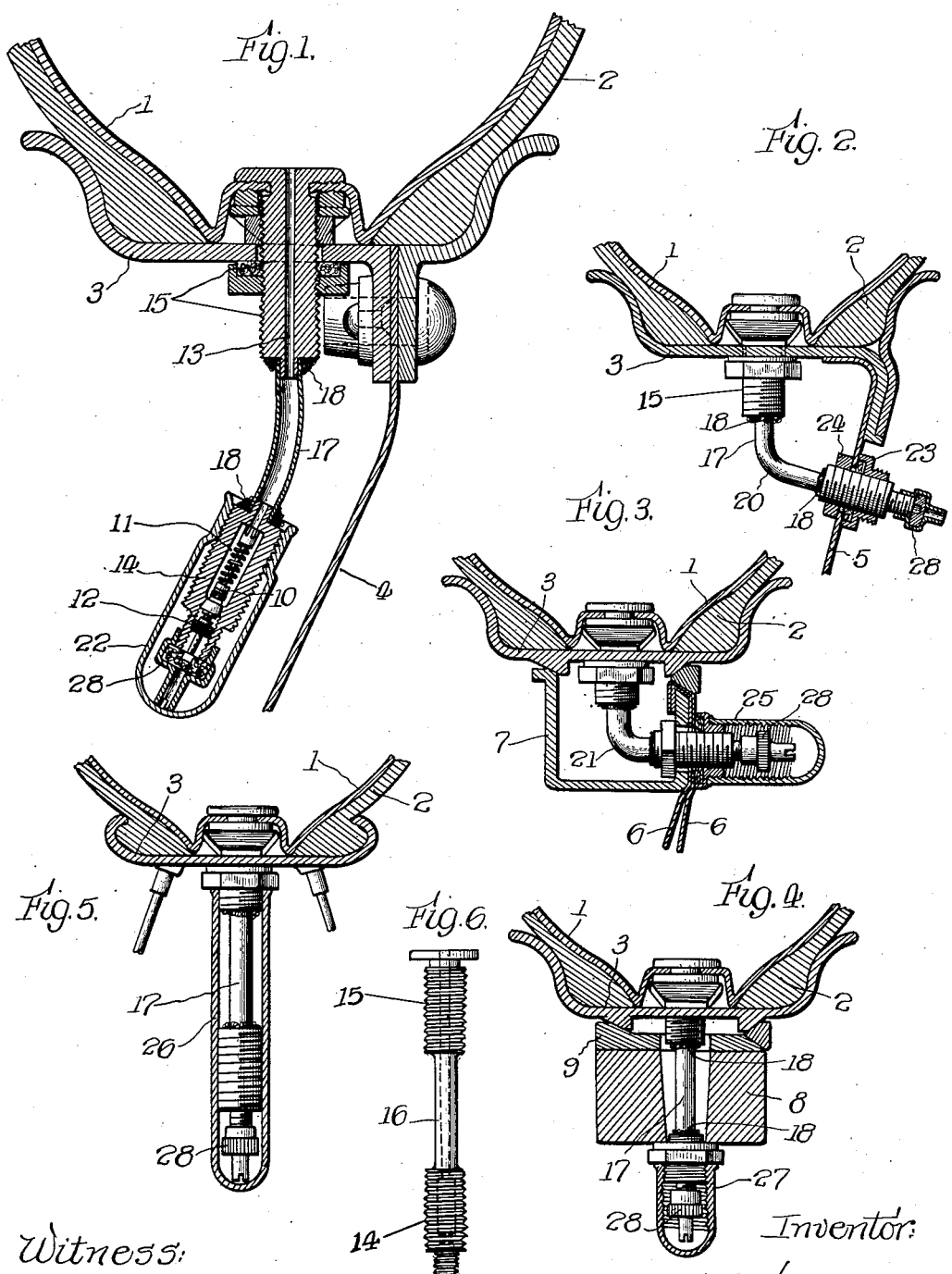

1,507,647

UNITED STATES PATENT OFFICE.

WILLIAM ERASTUS WILLIAMS, OF CHICAGO, ILLINOIS.

FLEXIBLE AIR VALVE FOR AUTOMOBILE TIRES.

Application filed March 23, 1921. Serial No. 454,612.

*To all whom it may concern:*

Be it known that I, WILLIAM ERASTUS WILLIAMS, a citizen of the United States, a resident of Chicago, county of Cook, and State of Illinois, have invented a new and useful Flexible Air Valve for Automobile Tires, of which the following is a specification.

My invention relates to the air valve that is inserted into a pneumatic tube by means of which the tube is inflated and deflated as desired and the object of the invention is to produce a valve of which the stem containing the valve proper may be flexed to suit different types of wheels, so that a single type of air valve may be sent out with all tires and the users may apply these tires to the various different types of wheels by adjusting the air valve stem to suit each particular case without having to change stems as has heretofore frequently been necessary.

Reference will be had to the accompanying drawings in which Figure 1 is a cross-sectional elevation of a tire and rim of a disk wheel with my invention applied thereto.

Figure 2 is a view similar to Figure 1 but on a smaller scale and showing the valve arranged in a different position from that of Figure 1.

Figure 3 shows the valve applied to what is known as a steel felloe wheel and shows the rim of the wheel in cross section.

Figure 4 shows my valve applied to an ordinary wooden wheel.

Figure 5 shows the valve applied to a wire wheel.

Figure 6 is the preferred form of the valve stem or valve containing tube.

In the drawing 1 indicates the inner tube of an ordinary pneumatic tire. 2 indicates the casing and 3 the main tread base of the rim which is substantially the same in all of the figures, in so far as my invention is concerned.

4 indicates a disk, of one form of a disk wheel, which forms the web or wheel body of a disk wheel. 5 indicates another form of disk. 6 indicates the disks of a double disk wheel shown in Figure 3, and 7 indicates a steel felloe used with the double disks 6. This steel felloe may be also used with the wooden spoked wheel.

8 in Figure 4 indicates the wooden felloe of a wooden wheel and 9 indicates the metal felloe band of the wooden wheel. Heretofore air valve stems have been made rather stocky and strong and not intended to be flexed or bent in applying them to the rims of wheels. On the contrary the valve stems have been made superstrong with the intention that they shall not in any manner bend in service. The air valve stems prime function is to furnish a seat wherein is located the valve mechanism. This particular valve mechanism is shown assembled as 10 in Figure 1 and since that particular mechanism is no part of this invention I will not go into detailed description beyond showing that the chamber in which this valve mechanism is located is indicated by 11 and the valve is retained therein by means of a nut 12 in a common manner.

It is necessary that this chamber 11 shall always be maintained in direct rigid form in order to permit the valve mechanism to properly operate but the valve stem itself, outside and beyond the region of this chamber 11 may be bent or flexed as may be needed, so long as the tube is not ruptured allowing the escape of air from the duct 13 which opens into the interior of the inflated tube.

Where the air valve stem projects through the rim it is necessary that the stem itself should be more or less rigid and strong to resist wear and shear strains, and the end portions 14, 15, should be strong enough to resist shocks met in service, while the intermediate portion may be smaller and pliable, like copper or soft brass tubing, for example. This stem may be of integral metal indicated by Figure 6, having the small waistlike flexible middle portion 16 as shown in Figure 6. Instead of making the slightly flexible portion 16 integral, I may arrive at the same result by making the valve stem in three pieces, having the flange end piece 14 and the rim piece 15 connected by a smaller piece of tubing 17 brazed or otherwise secured as indicated by 18 to the stem ends, thus producing what amounts to an integral one piece valve stem with the flexible body 17 in the middle.

These stems are made in the form of Figure 6 or in the form shown in Figure 1, and are sent out by the tire manufacturer in straight form as is indicated by Figures 4, 5 and 6 and thus may be used in the same manner that the ordinary straight stiff valve stems have heretofore been used.

When the tire user who has disk wheels of the type shown in Figures 1 and 2, gets a tire tube with the straight valve stem he simply flexes the small body of the stem to produce the clearance desired from the disk as is shown in Figure 1, or flexes it in order to allow the outer end of the valve stem to pass through the aperture in the disk as is indicated in Figure 2. If a metal felloe wheel is used he user may bend sharply this narrowed middle body portion of the stem and allow the outer end to project laterally through a hole in the hollow felloe as is indicated by Figure 3. Thus there will occur the rather sharp bend of the waist or small body of the stem as indicated by 20 in Figure 2 or the sharper bend shown by 21 in Figure 3.

In the manufacture of my valve stems of the form shown by Figure 1, I prefer to use in the waist, or middle portion 17, a more flexible metal than that of which the end portions are made. In making it like the preferred form shown in Figure 6 the metal may be homogeneous and in that case I anneal the middle body or waist portion 16 to make that portion softer and tougher than the end portions when the metal is such as to make such treatment desirable.

In the case of the form shown in Figure 1 the dust cap 22 would be rather short and screw on to only the end 14 of the valve stem. In the case of the form shown in Figure 2 the end of the stem is secured by nuts 23 and 24 to the disk itself and no regular dust cap will be used. In the form shown in Figure 3 a dust cap 25 may be used. With the wire wheel the ordinary dust cap 26 may be applied as is shown by Figure 5. The ordinary dust cap may also be used with the wooden type of wheel as indicated by 27 in Figure 4.

The dust cap feature of the type wherein the cap covers the whole outside of the stem is more or less an optional matter and frequently caps are lost and are not generally a necessity, although commonly used. Many people discard them entirely. However, a small cap indicated in the drawings at 28 is generally used to protect the nipple end of the valve stem and the same general cap of this type may be used with this invention with the same effect as with the old type of valve stem.

Considering the number of valves produced, any decrease in weight without sacrifice of quality is highly important to the manufacturer.

Further every ounce of weight on the margin of a wheel produces inertia in the starting and stopping of the car which makes itself appear as an expense of operation in the cost of fuel and engine power. This although slight, measured in terms of the cost of the valve is serious in determining the choice of the valve to be used and it is safe to say that the economy in the inertia of my lighter valve stem, during the normal life of a car, will save perhaps the entire cost and more of a valve stem, which measured in terms of valve stem costs makes my invention a valuable improvement.

Further, in the use of the common straight stem, the distance of its outer end portion from the wheel disk is often so slight that inflating is inconvenient and hence the driver often avoids trouble by allowing tire pressure to fall unduly, and by running with low pressure loses many times the cost of my valve stem.

What I claim is:

1. A one-piece metal valve stem consisting of straight inflexible segments connected by a readily flexible tubular segment.

2. A one-piece valve stem consisting of a metal tube having inflexible end segments connected by relatively thin, readily bent segment.

3. A valve stem consisting of straight, rigid, terminal metal segments connected by a readily pliable inelastic metal tube, whereby a primarily straight stem may serve, without addition or subtraction, as a straight or as an angular stem.

4. An all-metal valve stem comprising a straight, rigid terminal segment adapted for attachment to a tire mounted on a common rim, an opposite, rigid, straight, terminal segment to contain valve devices, and an intermediate connecting segment of non-resilient, pliable metal, of relatively small cross-sectional area.

Signed at Chicago, in the county of Cook and State of Illinois, this seventeenth day of March, 1921.

WILLIAM ERASTUS WILLIAMS.

Witnesses:
B. J. BERNHARD,
F. M. ZOBEL.